United States Patent
Beavers

(10) Patent No.: US 7,171,689 B2
(45) Date of Patent: Jan. 30, 2007

(54) SYSTEM AND METHOD FOR TRACKING AND FILTERING ALERTS IN AN ENTERPRISE AND GENERATING ALERT INDICATIONS FOR ANALYSIS

(75) Inventor: John B. Beavers, McLean, VA (US)

(73) Assignee: Symantec Corporation, Cupertino, CA (US)

( * ) Notice: Subject to any disclaimer, the term of this patent is extended or adjusted under 35 U.S.C. 154(b) by 793 days.

(21) Appl. No.: 10/080,574

(22) Filed: Feb. 25, 2002

(65) Prior Publication Data

US 2003/0167406 A1    Sep. 4, 2003

(51) Int. Cl.
G06F 11/30    (2006.01)
(52) U.S. Cl. .................................................. 726/22
(58) Field of Classification Search ............... 713/201, 713/200, 152–154; 709/223–224, 225; 726/22–25, 726/11–13; 706/50, 45, 61
See application file for complete search history.

(56) References Cited

U.S. PATENT DOCUMENTS

| | | | | |
|---|---|---|---|---|
| 4,864,492 | A * | 9/1989 | Blakely-Fogel et al. ...... | 706/45 |
| 5,893,083 | A | 4/1999 | Eshghi et al. ................. | 706/45 |
| 6,134,664 | A | 10/2000 | Walker | |
| 6,208,720 | B1 * | 3/2001 | Curtis et al. ........... | 379/114.14 |
| 6,212,649 | B1 | 4/2001 | Yalowitz et al. | |
| 6,266,773 | B1 | 7/2001 | Kisor et al. ................. | 713/200 |
| 6,298,445 | B1 | 10/2001 | Shostack et al. ............ | 713/201 |
| 6,321,338 | B1 | 11/2001 | Porras et al. ............... | 713/201 |
| 6,484,203 | B1 | 11/2002 | Porras et al. ............... | 709/224 |
| 2002/0019945 | A1 * | 2/2002 | Houston et al. ............ | 713/201 |
| 2002/0083168 | A1 * | 6/2002 | Sweeney et al. ............ | 709/224 |
| 2004/0250133 | A1 * | 12/2004 | Lim .......................... | 713/201 |

OTHER PUBLICATIONS

Barrus, J., "*Intrusion Detection in Real Time in a Multi-Node, Multi-Host Environment*", Master's Thesis, Naval Postgraduate School, Monterey, CA, i-xii, pp. 1-79, Sep. 1997.
"*SNIA CIM Interoperability Demonstration Backgrounder*", Storage Networking Industry Association, pp. 1-2, 2002.
"*SNIA Storage Management Initiative CIM/WBEM Technology Backgrounder*", Storage Networking Industry Association, pp. 1-2, 2002.
Hughes, K. and Wohlferd, D., "*Say Goodbye to Quirky APIs: Building a WMI Provider to Expose Your Object Info*", pp. 1-16 [online]. Retrieved on Dec. 24, 2002. Retrieved from the internet: URL:http://msdn.microsoft.com/msdnmag/issues/0500/wmiprov/print.asp.

(Continued)

*Primary Examiner*—Kim Vu
*Assistant Examiner*—Nirav Patel
(74) *Attorney, Agent, or Firm*—Gunnison, McKay & Hodgson, L.L.P.; Serge J. Hodgson

(57) ABSTRACT

A system and method for declaring alert indications that occur in an enterprise comprising translating a number of device outputs into a common format event using a number of translation files, and generating a number of knowledge-containing common format events based on matches between the common format events and knowledge base tables. A set of rules determines whether the knowledge base common format events rise to an alert indication for further automated correlation and analysis.

21 Claims, 2 Drawing Sheets

OTHER PUBLICATIONS

"*Common Information Model (CIM) Specification*", Version 2.2, Distributed Management Task Force, Inc., Portland, OR, pp. I-VI, 1-97, Jun. 14, 1999.

Davis, J., "*WBEM Services Specification JSR-0048*", Java One, Sun's 2001 Worlwide Java Developer Conference, pp. 1-19, 2001.

Bhat, G., "*WBEM Services API and Examples*", Java One, Sun's 2001 Worldwide Java Developer Conference, pp. 20-29, 2001.

Westerinen, A., "*Modeling Information In CIM*", Java One, Sun's 2001 Worldwide Java Developer Conference, pp. 31-43, 2001.

Ptacek, T. and Newsham, T., "*Insertion, Evasion, and Denial of Service: Eluding Network Intrusion Detection* ", Secure Networks, Inc., pp. 1-63, Jan. 1998.

Yang, J., Ning, P., Wang, X., and Jajodia, S., "*Cards: A Distributed System For Detecting Coordinated Attacks*", Center for Secure Information Systems, George Mason University, Fairfax, VA, pp. 1-10.

Magers, D., "*Packet Sniffing: An Integral Part of Network Defense*", 9 pgs., May 9, 2002.

King, N. and Weiss, E., "*Network Forensics Analysis Tools (NFATs) Reveal Insecurities, Turn Sysadmins Into Systems Detectives*", Information Security, 8 pgs., Feb. 2002.

Trenum, G., "*Practical Requirement for Level 2 IDIC Exam*", 15 pgs.

Shimomura, T., "Tsutomu Shimomura's Newsgroup Posting With Technical Detail of the Attack Described by Markoff in NYT", *Random Access*, 10 pgs., Oct. 12, 1997.

"*Dragon 5, An Intrusion Detection System for the Enterprise*", 5 pgs.

Stevens, W., *The Protocols, TCP/IP Illustrated*, vol. 1, Addison Wesley Longman, Inc., Reading, MA, pp. vii-xii, 7, 8, 1994.

Sinclair, C., Pierce, L., and Matzner, S., "*An Application of Machine Learning to Network Intrusion Detection*", The University of Texas at Austin, Austin, TX, pp. 1-7.

Butterworth, J., "*Practical Portion Of Intrusion Detection Immersion Curriculum*", 10 pgs.

Kobi, H., "*Beyond SNMP: The Benefits of Collecting Network Event Logs*", Technical White Paper, Network Intelligence® Corporation, Walpole, MA, pp. 1-10, Jun. 2002.

Harp, S., Geib, C., Goldman, R., Heimerdinger, W., Thomas, V., and R.A. Kemmerer Associates, "*Argus: An Architecture for Cooperating Intrusion Detection and Mitigation Applications*", Honeywell Technology Center, 18 pgs.

Barrus, J. and Rowe, N., "*A Distributed Autonomous-Agent Network-Intrusion Detection and Response System*", Proceedings of the 1998 Command and Control Research and Technology Symposium, Monterey, CA, Jun.-Jul. 1998, 12 pgs.

Frincke, D., Tobin, D., McConnell, J., Marconi, J., and Polla, D., "*A Framework for Cooperative Intrusion Detection*", Center for Secure and Dependable Software, University of Idaho, Moscow, ID, 13 pgs, 1998.

"*Managing Your Network With HP OpenView Network Node Manager*", Hewlett-Packard Company, Fort Collins, CO, pp. 1-675, May 2002.

"*HP OpenView Communications Event Correlation Services Developer's Guide and Reference*", Hewlett-Packard Company, Fort Collins, CO, pp. 1-150, Apr. 2001.

"*HP OpenView Communications Event Correlation Services SNMP Module*", Hewlett-Packard Company, Fort Collins, CO, pp. 1-62, Apr. 2001.

"*HP OpenView Communications Event Correlation Services Administrator's Guide*", Hewlett-Packard Company, Fort Collins, CO, pp. 1-121, Apr. 2001.

Beavers, J., U.S. Appl. No. 10/082,235, filed on Feb. 26, 2002, entitled "System Method for Managing Alert Indications in an Enterprise", 46 pgs total.

Beavers, J., U.S. Appl. No. 10/800,059, filed on Mar. 12, 2004, entitled "Method and Structures for Preparing Generic Rules for a Security Rules Processor", 49 pgs total.

\* cited by examiner

SYSTEM AND METHOD FOR TRACKING AND FILTERING ALERTS IN AN ENTERPRISE AND GENERATING ALERT INDICATIONS FOR ANALYSIS

FIELD OF THE INVENTION

The present invention is directed to a system and method that tracks and filters alerts, and in particular to a system and method which translates and adds knowledge to various alerts to provide useful alert indications for subsequent monitoring and analysis.

BACKGROUND ART

In the prior art, it is common to use a number of different types of devices to monitor enterprises, particularly network enterprises. A firewall device is one example of a device that is used to protect against unauthorized access into intranet and internet-based networks. Other devices may relate to routers, both internal and external, servers, both internal and external, wireless machines such as laptops, IDS', modems, and the like.

In many instances, these various devices monitor security-related threats and events and produce an output or stream of audit information, i.e., security events or alerts. These streams are received by an information manager, which then normalizes the information and sends the information to a security administrator.

One problem with these systems is that the security administrator is overloaded by the number of security events that are sent from the information manager. FIG. 1 illustrates such a scenario wherein a multitude of events 50 from an enterprise, e.g., security events, are sent to an overworked administrator 51. Even when the events 50 are transformed into neatly organized and normalized data 53, see FIG. 2, the administrator is still overworked with a multitude of modified inputs 55.

Secondly, prior art systems do not effectively link different types of devices together to better ascertain the type and/or source of a security event. For example, a security administrator may receive information from a firewall device, as well as a Linux or Windows NT device of an unauthorized logon to a network. The administrator gets two inputs for the same event, thus complicating the administrator's job in ascertaining the threat.

Consequently, a need exists to improve methods and systems used in the prior art to more effectively communicate alerts that occur within a given enterprise and are deserving of action on the part of an administrator.

The present invention solves this problem by filtering the number of alerts produced by various network devices, while at the same time adding knowledge to the alerts to produce fewer alerts but with more useful information related to each alert.

SUMMARY OF THE INVENTION

It is a first object of the present invention to provide a method of providing useful and concise alert indications for automated analysis and monitoring.

Another object of the invention is to reduce the number of redundant alerts so that the thus-produced alert indications are more manageable for subsequent analysis and monitoring.

A still further object of the invention is to eliminate the filtering of alerts via the writing of an unmanageable number of rules.

Yet another object of the invention is a system, which provides useful and concise alert indications for analysis and monitoring.

One further object of the invention is a system and method which is adapted to any enterprise that has a number of enterprise infrastructure devices or elements that send and receive information, wherein the monitoring the information is useful for managing the enterprise.

Other objects and advantages of the present invention will become apparent as a description thereof proceeds.

In satisfaction of the foregoing objects and advantages, the present invention provides a method of producing at least one alert indication based on a number of events derived from the enterprise. The method comprises providing a plurality of enterprise device outputs, at least a portion of the outputs having different formats, and wherein each output contains an event relating to an enterprise device. Each output is translated into a common format event, and knowledge is added to the common format event using knowledge base table files to generate a knowledge-containing common format event. One or more rules from a set of rules are applied to the knowledge-containing common format event to generate the alert indication and if desired, add information thereto, wherein the rules govern generation of the alert indication.

The common format event contains at least a generic description of a specific event occurring as part of each device output.

The translating step further comprises matching data values in the device output with a signature specification for each enterprise device. The signature specification contains a number of signatures, a first location identifier for each signature; and a first key. The signature is a listing of names found in the device output, the first location identifier determines the method used to locate a name in the device output, and the first key determines where to locate the name in the device output. A message type is also identified from a plurality of message types for each enterprise device based on the device output as part of the translated common format event. The remainder of the translated common format event is produced in argument name and argument value pairs using an argument specification. The argument specification contains a listing of arguments, a field type, a second location identifier for each argument, and a second key. Each argument is a listing of argument names for inclusion as the translated common format event, the field type specifies the form of the argument value, the second location identifier determines the location of each argument value in the device output, and the second key locates the argument value in the device output to be displayed with the argument name.

The generating step further comprises comparing the common format event for each network device to a number of knowledge base table entries contained in a knowledge base table, wherein knowledge is added from one or more of the knowledge base table files when a match between the translated common format event and the entry in the knowledge base table is made.

The enterprise devices can be a server (internal or external), a firewall (internet or intranet), a modem, a work station, a router (internal or external), a remote machine, an intrusion detection system, an identification and authentication server, network monitoring and management systems, or one or more combinations thereof or any network device capable of generating alert or logging data streams.

The knowledge-containing common format event comprise one or more names selected from the group of a device alert, a generic alert, a threat severity, a benign explanation, a recommended action, a common vulnerabilities and exposure code, a conclusion, and a category code, and a corresponding value for each name. Other names as would be appropriate for a given enterprise can also be selected.

The set of rules determines whether the knowledge-containing common format event is generated. Other conditions can be imposed for generation of an alert indication such as that each output must occur a number of times over a set period of time before an alert indication is generated. The output can be one of an unauthorized login, an unauthorized physical entry, and an attempt to bypass a firewall, or others yet depending on the enterprise device in use. The rules can also add information to the translated event for further analysis by a central alert correlation facility The invention also entails a system producing at least one alert indication based on a number of events derived from an enterprise. The system includes a plurality of enterprise devices, each device capable of producing an output, a number of translation files, the translation files allowing the output to be translated into a common format event, a number of knowledge base table files, matching of the common format event with one or more of the knowledge base table files adding knowledge from the matched file to generate a knowledge-containing common format event, and a number of rule files, the rule files governing generation of the alert indication.

The system also utilizes the enterprise devices as described above, i.e., software sensors associated with hardware devices, as well as the knowledge-containing common format event of one or more names selected from the group of a device alert, a generic alert, a threat severity, a benign explanation, a recommended action, a CVE code, a conclusion, and a category code, and a corresponding value for each name, and the common format event comprises a message, and a number of name and value pairs derived from the output of the enterprise device.

BRIEF DESCRIPTION OF THE DRAWINGS

Reference is now made to the drawings of the invention wherein.

DESCRIPTION OF THE PREFERRED EMBODIMENTS

Figure 1:
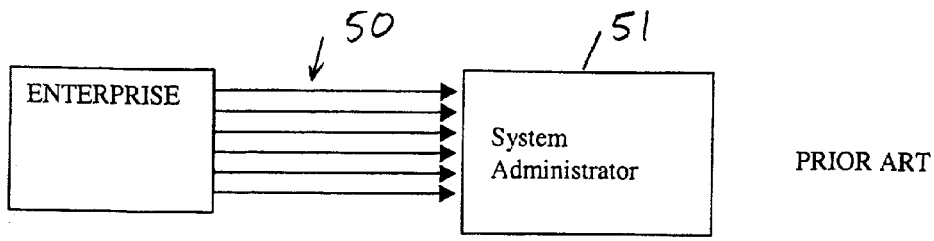
FIG. 1 represents a prior art system of monitoring events in an enterprise.
Figure 2:
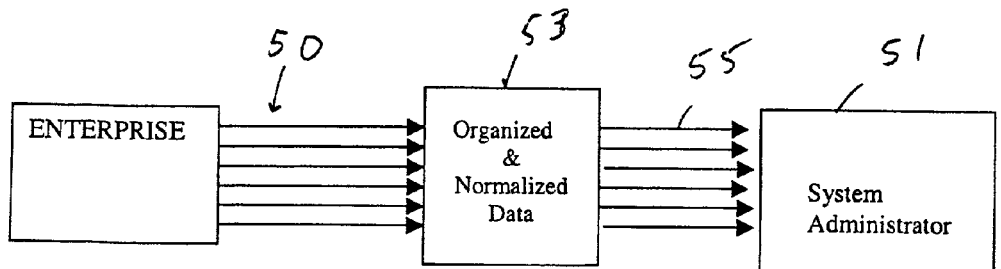
FIG. 2 represents another prior art system of monitoring events in an enterprise.

The present invention is a significant improvement in monitoring of enterprises, particularly, enterprises such as computer networks that must be monitored for security-related events. In contrast to prior art methods and systems where an overwhelming number of unclear security events are sent to an administrator to sort out, the present invention filters a first set of events from a number of different enterprise devices to produce a vastly reduced number of events. At the same time, knowledge bases are used to impart additional knowledge to the events. A rule processor is employed to produce a reduced number of alert streams or indications. These alert indications can be further processed as would be within the skill of the art, e.g., displayed and analyzed themselves in order for action to be taken or correlated using known techniques.

The invention relates to device experts which are a highly specialized form of software "agents" as they are sometimes called. These devices or software agents are usually stand-alone services that have detailed knowledge of a particular component class within a network. A key distinguishing feature of the invention is the use of knowledge, i.e., a particular type of device expert contains and makes use of detailed knowledge about a particular network component. For example, an NT Device Expert contains knowledge about how to obtain security-related events within the Windows NT environment, and the device expert also uses this knowledge to decide what events might be worth reporting to a central alert correlation facility. This facility can be any type of software system that would use the output of the device experts and correlate for further analysis by a system manager of administrator. One example of such a facility is disclosed in assignee's related application entitled "System And Method For Tracking And Filtering Alerts And Declaring Incidents Based On The Alerts In An Enterprise", which is hereby incorporated in its entirety by reference.

Device experts are generally semi-autonomous services running somewhere on the enterprise or enterprise network. These devices are considered to be any enterprise infrastructure element capable of receiving and/or sending information over any media, e.g., a network itself, virtually any component or components associated with a network, badge readers, etc. Examples of device experts are:

NT device expert
Solaris device expert
Linux device expert
Raptor Firewall device expert
Snort device expert
Cisco router device expert
HP Openview device expert
NetRanger Intrusion Detection System (IDS) device expert Often device experts run on the computers they are monitoring (e.g. an NT device expert running on a desktop workstation or NT Server). In some cases, it is not possible to run a device expert on the device it is monitoring, such as a router; in this case the device expert typically runs on a computer that has ready access to the router monitored device. Device experts can also be centrally located in instances where it is not feasible or desirable to run the experts on the computers being monitored. Device experts can have the following functions:

1) Translate external event streams (e.g. IDS outputs, various log file updates, or raw security information about an NT system) into the common "language" for subsequent use.

2) Use a knowledge base data file to do initial interpretation of the codes generated by the external source. This step can eliminate the need to write hundreds of rules for the device expert.

3) Use a rule base to do final interpretation and make final decisions on whether to inform the central alert correlation facility of an event.

4) Send the resulting translated message off to central alert correlation facility for correlation and possible display to security administrators.

Figure 3:
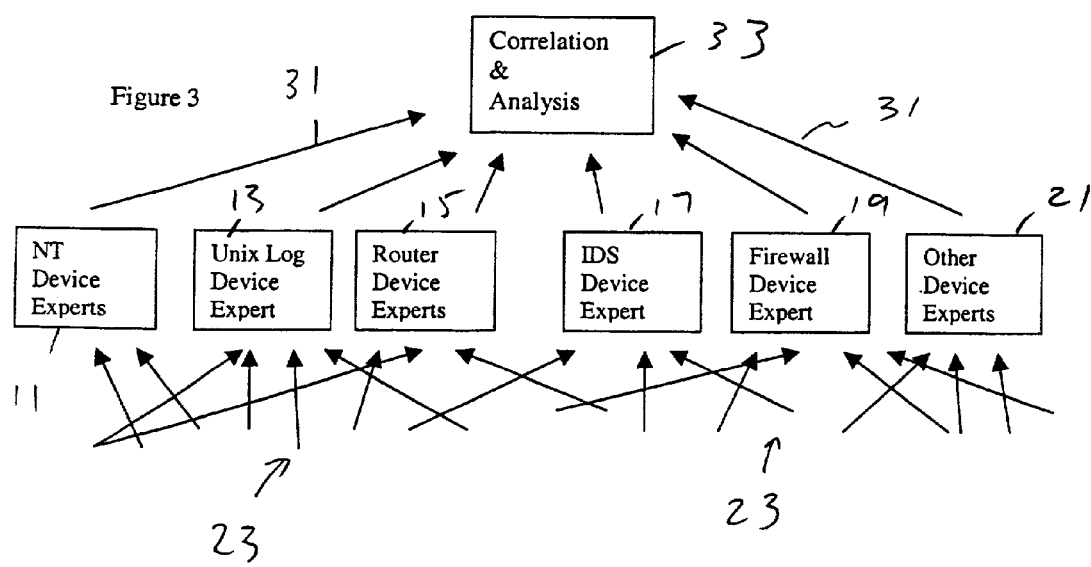
FIG. 3 is a schematic showing a number of device experts handling a multitude of events for subsequent correlation and analysis.

FIG. 3 represents a typical assortment of device experts 11, 13, 15, 17, 19, and 21 receiving a multitude of events 23 from enterprise devices (not shown) such as a firewall, a server, a router, a modem, a wireless remote machine, etc. For example, the NT device expert 11 may receive output from the server of a network, whereas the firewall device expert 19 may receive output from an internet or intranet firewall.

Each of the device experts produces an output 31, which may be a much lower intensity stream of alert indications than the events 23 being input into the various device experts 11–21. These lower intensity alert indications are much more manageable for a central alert correlation facility to deal with, particularly when the alert traffic volumes 23 are intense. It should be understood that the output 31 from the device experts can be used in any number of ways as represented by the correlation and analysis box 33. The information can be displayed to one or more individuals to analyze, or can be further correlated in accordance with known correlation systems. However, the output of the device experts is far better in terms of the prior art systems since the frequency of events is vastly reduced, and knowledge is imparted to the output to aid in analyzing the output by human analysts or more probably by central automated correlation facilities as discussed in applicant's co-pending application noted above.

Figure 4:
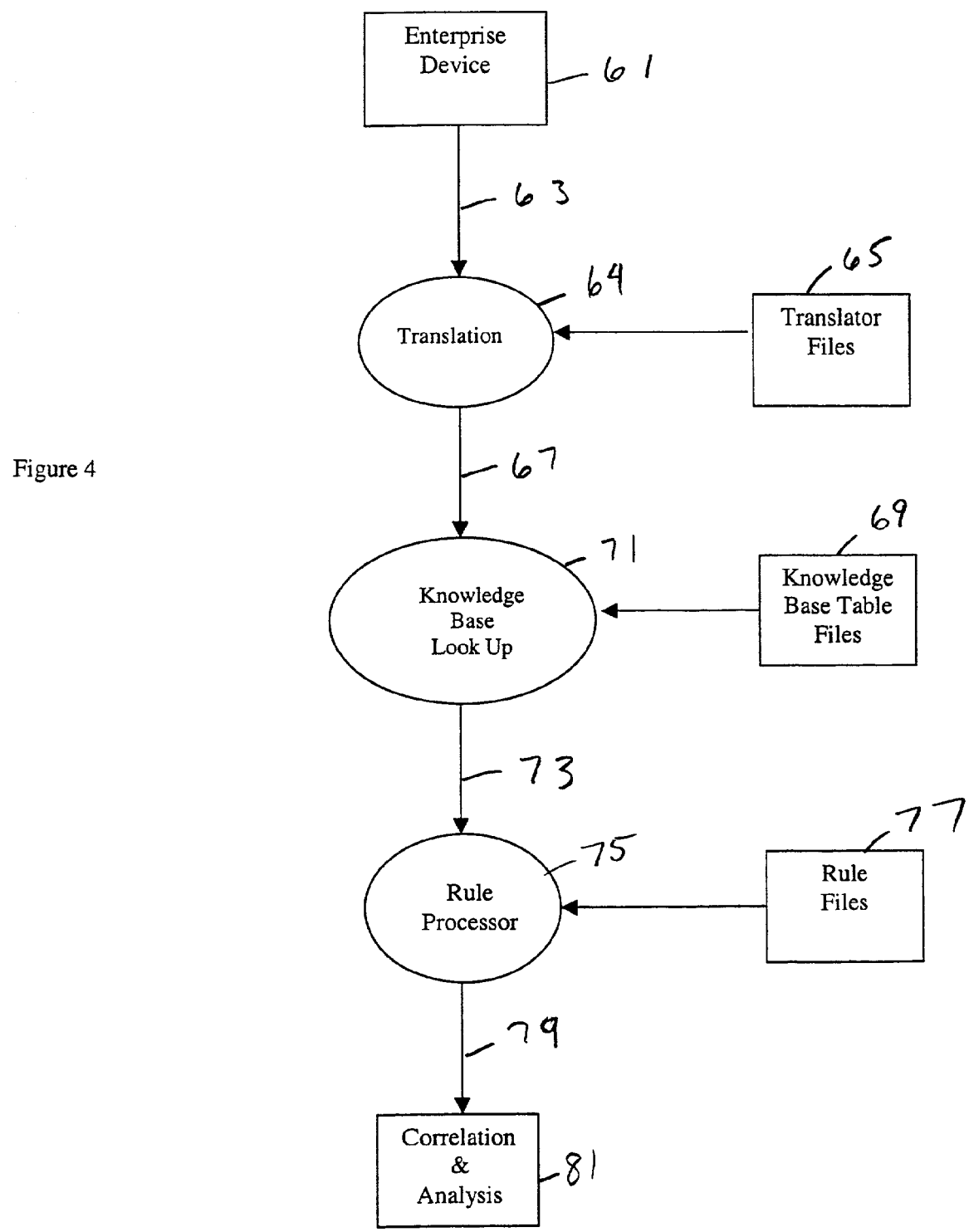
FIG. 4 is a flow chart showing the handling of events by a device expert.

FIG. 4 shows the steps involved in processing an enterprise event by a device expert to product an alert indication.

The enterprise device is depicted by reference numeral 61 with an output 63. As noted above, the enterprise device can be anything that produces an output information which may be useful for analyzing, particularly in the field of security events such an improper logins, or the like. The output 63 is translated at translation step 64 using translator files 65 to produce a common format event or message 67. The advantage of this step is that no matter what the form of the output 63 of the enterprise device 61, the translation 64 converts the output 63 into a common format output 67 such as a text message, e.g., a name and value pair. This greatly simplifies the information filtering down from the enterprise device for monitoring of the enterprise, e.g., a central alert correlation facility and subsequently a system administrator.

The translated event 67 is then compared in look up step 71 with entries or lines contained in the knowledge base table 69. If a match occurs between the information in the translated event 67 and the table entries, additional knowledge is added to the translated event based on one or more matches. Then, a knowledge-containing translated event 73 is generated.

The knowledge-containing translated or common format event 73 is then processed at 75 using one or more rule files 77. The rule files 77 determine what happens to knowledge-containing translated event 73. For example, a rule could be used that sends every knowledge-containing translated event 73 as an alert indication 79 on for subsequent correlation and analysis at 81. The rule processor can evaluate any number of things to determine whether or when the event stream 73 should be sent onward. For example, the rule processor could require that if a specific event occurs so many times in a given time period, the alert indication 79 should be sent onward. It could be that any event 73 that has a certain severity attached to it is sent on as an alert indication. The rule processor allows one to identify events that are merely considered to be noise of the enterprise, such that such events do not have to be considered for further correlation and/or analysis.

The rule processor keeps track of which network devices have been recently scanned for vulnerabilities by noting such events for each affected asset in a memory-resident (high-speed access) dynamic rule processor data table. Alert indications are then only sent onward if additional types of events are detected for one or more of the affected assets indicating that vulnerabilities are now being exploited.

Rules and data representing customer-specific enterprise policies and enterprise network topology are applied so that alert indications are only sent onward if they are considered serious for the particular location where they were detected. For example, port scan events on an external enterprise firewall might be considered routine and not worth passing onward. However, port scan events applied within an internal and sensitive network (behind the firewall) might be considered to be extremely important. As an alternative example, events that appear to be probes may actually emanate from third-party network management software systems; such alerts can often be ignored by the rule processor based upon automated evaluation of protocols, ports, the details of the probe request, and source addresses.

Besides determining what should be done with the event stream, the rule could also add information to the translated event, this information being helpful to the central alert correlation facility and analysis downstream thereof. In this way, not only would the rule determine when or whether the event should be forwarded for further analysis, the rule could add information to the translated event if desired. An example of this type of rule would be:

The rule processor uses enterprise data stored in rule processor tables to conclude that the source network address indicated in an event lies outside of any valid enterprise networks. Information is then added to the alert to indicate that the event was caused by a device that does not belong to the enterprise. This information is often used in later steps of automated analysis to help determine whether the event is hostile or benign.

The rule processor can be considered to be an intelligent filter in that it controls the output of the knowledge-containing and translated event, and if desired, can also add knowledge in addition to that acquired from the knowledge base tables. The rules can be default based wherein one set of rules would apply regardless of the enterprise, or the rules could be customized to be enterprise-specific.

The following details what is generally needed to configure a device expert so that a number of external stream events can be first translated, then modified with the addition of knowledge, and finally processed using rules to produce an output that is useful for further analysis.

To fully configure a device expert the following text files can be generally created/edited:

1) <ExpertName>.ini—File used for basic configuration of the expert. Defines parameters such as rule file name, mapping file names, maximum event log file size, etc.

2) <ExpertName>.trn—File that defines how to "translate" input (external) event stream formats into an internal common format.

3) <ExpertName>.kbt—Device Expert Knowledge Base Table file. This file adds additional information such as threat codes and a user-friendly description of the event. This table may contain as few as two fields: a DeviceAlert code and a GenericAlert Code. An event is assigned a DeviceAlert code by the device expert, and that DeviceAlert code is mapped to a GenericAlert code in the knowledge base table file. Other fields may also be appended such as Threat Category, Description, etc. In fact, almost any type of field may be appended depending on the type of enterprise being monitored. These fields could also depend on the information found in the knowledge base table.

4) <ExpertName>.rule—File containing the rule base for the expert.

Below is an example of creating/editing Device Expert Startup (*.ini) files for an NT expert. These files tend to have the same basic format from one device expert to another, although there are some variations, particularly for customized experts (experts that don't deal with standard text event streams). The example below is fairly typical—Standard name/value strings define such things as which translator, rule, and other configuration files to use. Other parameters tell the device expert how big event log files should be allowed to get, sampling rates, etc.

```

# Type of expert

ExpertType:LinuxExpert;

# Rule file to apply rules

RuleFile:/usr/Manager/KnowledgeBase/OperatingSystems/Linux/
LinuxJoin
tRules.rule;
#KBT file
AttackInfoFile:/usr/Manager/KnowledgeBase/OperatingSystems/Linux/Lin
ux.kbt;

# Name of this expert's log file

ActivityLog:/usr/Manager/LinuxExpert/LinuxExpert.log;

# Number of bytes to log before wrapping

MaxActivityLogSize:1000000;

# Logging level to be used 0 = none, 5 = maximum

ActivityLogLevel:1;

# Use formatted time in log (TRUE) or use milliseconds (FALSE)

ActivityLogPrettyTime:FALSE;

# Path used to find the Locator.ini file

LocatorFilePath:/usr/Manager/Com/;

# Name used to send messages to this expert

RegistrationName:<Hostname>LinuxExpert;

# Port this expert will monitor for connections

ListeningPort:1712;

# The specific IP address to bind to when the host is multi-homed

#BindAddress:10.193.111.69;

####################
#Sensor Records

#Note: There must be a space at the end of each line in the record
# except the last one which is terminated with a semicolon (;)

####################

# LogSensor

Sensor:LogSensor
ParameterFile:/usr/Manager/KnowledgeBase/OperatingSystems/
Linux/Linu
xSystemLog.ini
MaxEventsToRead:50
SampleRate:5;

# FileSensor

Sensor:FileSensor
```

-continued

```
ParameterFile:/usr/Manager/KnowledgeBase/OperatingSystems/Linux/
Linu
xFileSensor.ini
MaxEventsToRead:50
SampleRate:5;
```

Once startup is initiated, the device expert translates the raw external security event into a translated event. To accomplish this translation, the device experts load event stream translation data from a text file. These "translation specifications" tell the standard device expert translation module how to convert external event streams into the standard format for later use by a system manager. This type of translation is preferred for events that are in text format or that can be readily converted into text formats. For binary event streams, specialized software is usually added to standard device experts in order to do the translation from binary (this is seldom needed). Since such software is readily available, a further description is not deemed necessary for understanding of the invention.

A device expert translation file is a text file (usually with a .trn extension) that can contain one or more translation specifications. Translation specifications are expressions within the translation file that tell the device expert how to translate a single type of external message. Each translation specification is terminated using a semicolon (";"). Ideally, an event from a device will trigger at most one of these translation specifications. A translation specification can consist of four components: Match Criterion, Signature Specification, Message Type, and Argument Specification. It is preferred that these components appear in the order listed below.

Translation Specification Details

The following explains how the four components of a translation specification work:
*The Match Criterion
*The Signature Specifications
*The MessageType
*The Argument Specification.

```
Match:ALL
    Signature:(su) LocMethod:POSITION Key:3
    Signature:session LocMethod:FOLLOWS Key:(su)
    Signature:opened LocMethod:FOLLWOS Key:session
MessageType:LinuxLogMessage
    Argument:User LocMethod:FOLLOWS Key:by;
    Argument:PriviledgedUser LocMethod:FOLLOWS Key:user;
    Argument:DeviceAlert LocMethod:ACTUAL Key:LinuxSuLogin
```

Match Criterion

The Match Criterion specifies how the signature specification(s) (described next) will be compared to the text to be translated. Possible values are ALL, ANY, and SEQ. It is specified in the translation specification with the key word "Match" followed by any one of the possible values.

Possible Value Definitions:
ALL—If all values from the signature specification are located in the text to be translated, then the translation specification will be used to translate the text.
ANY—If any values from the signature specification are located in the text to be translated, then the translation specification will be used to translate the text.

SEQ—If all values from the signature specification are located sequentially in the text to be translated, then the translation specification will be used to translate the text.

Signature Specification

A signature specification specifies what data must be present in an event in order to use that particular translation specification. The signature specification consists of three components: Signature, LocMethod, and Key. These components should appear in the order listed. A translation specification may contain as many signature specifications as needed to ensure proper translation of a device alert.

The "Signature" field of a signature specification identifies the value that should be present in the text to be translated.

The "LocMethod" specifies the method used to locate the signature in the text to be translated. Possible values of LocMethod are:

POSITION—the signature value is to be found at the integer position specified by Key.

FOLLOWS—the signature value is to be found immediately after the string value specified by Key.

PRECEDES—the signature value is to be found immediately before the string value specified by Key STARTSWITH—the signature value may vary and can occur anywhere in the text to be translated but must begin with the string value specified by Key. Although the Signature component must exist for formatting purposes, its value will be ignored for the STARTSWITH LocMethod ENDSWITH—the signature value may vary and can occur anywhere in the text to be translated, but must end with the string value specified by Key. Although the Signature component must exist for formatting purposes, its value will be ignored for the ENDSWITH LocMethod.

EXISTS—the location of the Signature can be anywhere in the text to be translated. Although the Key component must exist for formatting purposes, its value will be ignored for the EXISTS LocMethod.

The "Key" part of the translation specification is the value used to locate the Signature in the text to be translated. The value of the Key component depends on the value of LocMethod specified.

Message Type

The MessageType is the second field in the translated message. It is specified in the Translation Specification by the key word "MessageType" followed by a message identification string.

Each device expert usually produces only one or two message types—it is intended to describe the general type of message that is being sent. For example, the Linux Device Expert produces two types of messages: LinuxLogMessages and LinuxFileMonitorMessages.

Argument Specification

Argument specifications tell the translator what arguments to put into the translated message string and how to find that data in the device message that is being translated. The Argument Specification consists of four components: Argument, FieldType, LocMethod, and Key. These components should appear in the order listed. They can be repeated as many times as necessary to gather the information required for a message.

Argument Specification Component Definitions:

Argument—an argument name to place in the message translation. Acceptable argument names can be provided by the enterprise owner or derive from terms commonly used in the art of device experts. A dictionary of these terms can be compiled if need be.

FieldType—The data type of the value that is being extracted from the message stream.

Possible values are CHAR,INT,ALPHANUM,STRING, TIMETYPE, PATMATCH, and "*"

*—The value can be of any data type.

CHAR—The extracted value must consist entirely of characters.

INT—The extracted value must consist entirely of numbers.

ALPHANUM—The extracted value must consist of a combination of characters and numbers.

STRING—The extracted value is a number of space-separated strings. This field type must be followed by a "NumStrings" field that specifies how many space-separated strings should be parsed.

TIMETYPEx—The extracted value matches the format of one of the defined time types. Currently there are eight time types available:

| TimeType1 | MMM DD hh mm SS.sss (Raptor Firewall) |
| TimeType2 | MMM DD YYYY hh mm SS (Tacacs) |
| TimeType3 | MMM DD hh mm ss (Unix syslog) |
| TimeType4 | sssssssssss (time in milliseconds) |
| TimeType5 | MM-DD-YYYY hh mm SS (Pix Firewall) |
| TimeType6 | dd/MMM/yyyy:HH:mm:ss (Web Log) |
| TimeType7 | MMM dd HH:mm:ss yyyy (Web Error Log) |
| TimeType8 | yyyy MM DD HH mm ss (NetRanger Log) |

PATMATCH—This FieldType can be used to specify a pattern for the value being searched for. The FieldType argument must be followed by a Pattern argument that specifies the pattern of the target value. For example, the following signature could be used to find an IP address in a log message:

Argument:SourceIP FieldType:PATMATCH Pattern: ##d.##d.##d.##d

LocMethod:POSITION Key: 0

The following codes can be used to create a pattern:

| d | required digit (0–9) |
| # | optional digit (0–9) |
| c | required character (A–Z) |
| ? | optional character (A–Z) |
| a | required character or digit (A–Z, 0–9) |
| x | optional character or digit (A–Z, 0–9) |

LocMethod—specifies the method used to locate the argument value in the text to be translated.

Valid LocMethod specifications are:

POSITION means the argument value is to be found at the integer position specified by Key.

FOLLOWS means the argument value is to be found immediately after the string value specified by Key.

PRECEDES means the argument value is to be found immediately before the string value specified by Key STARTSWITH means the argument value may vary and can occur anywhere in the text to be translated but must begin with the string value specified by Key.

ENDSWITH means the argument value may vary and can occur anywhere in the text to be translate but must end with the string value specified by Key.

ACTUAL means the string value specified by Key is the actual argument value.

RELATIONAL is used to find a signature that immediately follows or precedes the previous signature. If a value is immediately after the value of the previous signature in the event stream, the key AFTER should be used with the RELATIONAL location method. If the value immediately precedes the value of the previous signature in the event stream, the key BEFORE should be used with the RELATIONAL location method.

Key—the value used to locate the appropriate data for that field in the text to be translated. The value of the Key component depends on the value of LocMethod specified.

The following is an example of a single translation specification within a translation file:

Match:ALL
   Signature:(su) LocMethod:POSITION Key:3
   Signature:session LocMethod:FOLLOWS Key:(su)
   Signature:opened LocMethod:FOLLOWS Key: session MessageType:LinuxLogMessage
   Argument:User LocMethod:FOLLOWS Key:by;
   Argument:PriviledgedUser LocMethod:FOLLOWS Key: user;
   Argument:DeviceAlert LocMethod:ACTUAL Key: LinuxSuLogin The following is an example of Linux log file data to be translated using the above specification:

10:24 Phantom SystemLogger: (su) session opened for user root by paul (uid0)

The above message is translated into the following standard message format.
LinuxLogMessage User:paul PriviledgedUser:root DeviceAlert:LinuxSuLogin This follows the standard message format of a message type tag followed by a series of name/value pairs. The message tag is "LinuxLogMessage" (name of translation), and the name/value pairs are User:paul; PriviledgedUser: root; and DeviceAlert (the default or customized name): LinuxSuLogin. This message format is highly readable and appears to be capable of capturing all of the semantics needed for the application. This message simply tells the observer that a user paul has logged onto the system instead of the authorized user root.

Once the message is translated into a common format, the system then uses the knowledge base table files to add interpretation fields to the translated event to further help the central alert correlation facility in assessing the supplied information. The role of knowledge base table files is distinct from the role of the device expert standard translator, although both facilities are involved in generating a standard message that contains useful information. The distinction is that the translator simply maps data elements from external event stream representations into a standard internal format on a one-for-one basis. The knowledge base table files, on the other hand, are used by the standard device expert knowledge table lookup facility to add interpretation and meaning to the codes that are mapped by the translator. An example to illustrate this is as follows. An event stream from a BRAND-X Firewall is being processed (Fielded by ACME Security Company)

A raw external event stream message sent to the BRAND-X firewall device expert looks like this:
002710 12:48:02 FragPkts from 112.131.131.222 to 33.212.11.31 using TCPIP prot on port 32.

The translator, using the translation specification described above, maps this external message into a standard internal message format, using argument names and value formats that are understood by all of the device experts in the system:

FirewallEvent SensorType:BRAND-X-Firewall EventType: FragPkts
   SourceIP:112.131.131.222 TargetIP:33.212.11.31 Protocol:TCPIP Port:32

This message may be sent directly to the central alert correlation facility for further interpretation. However, the message is still problematic in that it does not identify the meaning in a clear and understandable fashion. In other words, what does the message mean? Every firewall has its own unique event codes, and in this case, the Brand X firewall uses "FragPkts". The invention takes this event and maps the event code, i.e., "FragPkts", into something that has meaning.

The invention simply captures this mapping from vendor event codes to standard event codes in standard-format text data files for individual device experts. Using this approach, additional interpretation of device alert codes is done before the message is ever sent on to a system manager. The knowledge base table file is tabular, and has the same format for every device expert. The columns in the table are as follows:

DeviceAlert—The code taken from the device alert stream that uniquely identifies that alert.

GenericAlert—The GenericAlert code that corresponds to this particular DeviceAlert. For example, the NetRanger IDS might report a fragmented IP packet as DeviceAlert "232", while the Snort IDS might report a fragmented IP packet as DeviceAlert "FragPcktIP". The knowledge base table would ensure that both device experts report the fragmented IP packet alert with the same GenericAlert code (i.e. FragmentedIPPacket). This abstraction assists greatly with correlation at the information manager level.

Severity—The seriousness of the potential security implications of an event. 1=most serious, 5=least serious.

Threat1—The threat that is posed by an alert.

Threat2—An alternative threat that is posed by an alert.

Threat3—A second alternative threat that is posed by an alert.

BenignExplanation—A benign alternative explanation for the alert.

RecommendedAction—An action that should be taken in response to this alert.

CVE—The CVE (Common Vulnerabilities and Exposures) code that corresponds to this alert. The CVE database is maintained by Mitre, and can be found at http://cve.mitre.org.

Description—A description or a conclusion relating to the alert. This description should be concise and human-readable, particularly if it should be displayed using a graphical user interface or the like.

To get a device expert to use knowledge base table files, two special configuration items should be handled as follow:
   The translator file should be written so that one of the fields coming out of each message with an attack code that needs to be interpreted contains the field "DeviceAlert" (e.g. DeviceAlert:FragPkts).

There should be a knowledge base table file (e.g. BRAND-X-Firewall.kbt) and this file should be identified in the Device Expert's configuration (ini) file.

An actual knowledge base table entry used might look like this, where the "," symbol is used to separate the fields:
DeviceAlert GenericAlert Severity Threat1 Threat2 Threat3 BenignExplanation RecommendedAction CVE code Description (conclusion)
~IPExploits
FragPkts, FragmentPck, 3, BypassIDS, null, null, NormalTCPTraffic, BlockSource, null, Fragmented packets detected at firewall—possible penetration attempt.

Using this single line entry in a data file is advantageous in that it can replace all of a rule text that would produce the same output. Examples of rule texts are shown below, including the one using "FirewallEvent" and "Brand-X-Firewall." Using the knowledge base table files greatly simplifies knowledge representation and improves device expert performance (rule processing is a good deal more CPU intensive than table lookups).

Here is how the fields in the knowledge base table entry are used in the example wherein the message translator produced the following output message:
FirewallEvent SensorType:BRAND-X-Firewall DeviceAlert:FragPkts
   SourceIP:112.131.131.222 TargetIP:33.212.11.31 Protocol:TCPIP Port:32

If the device expert sees the "GenericAlert" field, and it also has a *.KBT file to refer to, it will try to append fields on to the message that has emerged from the translator so the updated event message looks like this:
FirewallEvent SensorType:BRAND-X-Firewall DeviceAlert:FragPkts
   SourceIP:112.131.131.222 TargetIP:33.212.11.31 Protocol:TCPIP Port:32
   Threat1: BypassIDS Threat2:null Threat3:null Severity:3 Category:IPExploits BenignExplanation:NormalTCPTraffic RecommendedAction:BlockSource CVE:null Description: "Fragmented packets detected at firewall-possible penetration attempt."

The knowledge base table lookup module creates these fields by searching the knowledge base table file for the DeviceAlert "FragPkts". Then, it reads the information from the FragPkts record or entry and appends it in the proper format to the message that was already started by the device expert translator module, i.e., beginning with "Firewall Event", SensorType:BRAND-X-Firewall and ending with "Port:32". This is an example of the knowledge adding step of the inventive method and system.

It should be noticed that the header records are preceded by the "~" character. These are "category codes" that appear before groupings of rows in the knowledge base table to identify the category an alert falls into. This also makes more information available in the output of the knowledge base table lookup-notice the "Category:IPExploits" data element displayed in the above FirewallEvent message output from the knowledge base lookup.

The result of the use of such table lookups is that the message passed on from the device expert can have a great deal of meaning to the system with a minimal or much-reduced rule set required within the device expert. In the example above, before even sending a message to the system manager, the system has progressed from having an attack code that is meaningless to the system, i.e., (FragPkts), to a GenericAlert code that is known, i.e., (FragmentPck), a Threat code (BypassIDS) and even a designation of the category of threat being reported (IPExploits).

It should be noted that a common message dictionary is provided which persons authoring the knowledge base table files should consult when building the knowledge base table files. This dictionary contains acceptable threat, category, and field name values for use in the device expert knowledge bases.

The inventive method described above as it pertains to creating and editing the knowledge base table files is vastly superior to an alternative wherein an interpretation rule is written in the device expert rule base for every attack code type. One example of an interpretation rule might look like this:

If EventType is "FirewallEvent" and SensorType is "BRAND-X-Firewall" then

```
If EventCode is "FragPkts" then
   SendMessage StandardEventCode:FragmentedPackets
      Description: "Possible attempt to bypass firewall with
   fragmented packets";
      Endif
Endif
```

This type of a rule would tell what vendor code "FragPkts" means. These are the sorts of rules used in systems for more complex processing, and his would work, but the problem is that one ends up writing hundreds of rules. For example, interpretation of all the event types from just one device expert, e.g., the HP Openview Device Expert, would require well over 600 rules just to perform the interpretation step. This does not take into account any correlation between events. The present invention avoids this problem by the creation and editing of the knowledge base table files, wherein useful information can be added to the alert stream without the need for extensive rule writing.

Rule files for device experts can be as simple or complex as is appropriate for particular applications. A simple rule set for a device expert is as follows:
Execute
   SendMessage {Message};
EndExecute The "Execute" keyword is basically like an "If", except it always fires every time the rule base is checked. This degenerate case represents a device expert where all the interpretation work is being done using the knowledge base table facilities discussed in the previous section. Alternatively, one may decide to minimize the use of CPU cycles used in the local machine, as in the case of a device expert running in a PC workstation.

Another example from a Raptor firewall expert rule base is as follows:
Check for IP address spoofing.

```
If {MessageType} is "AddressSpoof" then
   SendMessage ReportDest {MessageType} "TargetIp" {PacketAddr}
      "ExpertType" {ExpertType} "SensorType" {SensorType}
      "ExpertIP"
   {ExpertIp}
      "DeviceIP" {DeviceIp} "SourceIP" {RealAddr} "TimeInMilliSecs"
   {TimeInMilliSecs};
Endif
#Check for attempt to access protocols that have been disabled on this
firewall.
```

-continued

```
If {MessageType} is "UnauthorizedProtocol" then
    SendMessage ReportDest {MessageType} "Application" {Application}
"ExpertType" {ExpertType}
        "SensorType" {SensorType} "ExpertIP" {ExpertIp} "DeviceIP"
{DeviceIp} "Protocol" {Protocol}
            "Details" {Details} "TimeInMilliSecs" {TimeInMilliSecs};
Endif
```

The two rules shown above represent a very basic approach to writing device expert rules. These rules simply check the message type of the latest firewall event to decide whether might be of interest to the system manager.

A more interesting case is presented in the next code fragment from the same Raptor firewall rule base. Here, the rule engine is asked to remember the number of login failures for a particular user, then send an event downstream of the device expert, e.g., to a system manager, only after a particular threshold of failed authorization attempts is exceeded:

```
#Check for authorization failures (from users who attempt to log into
firewall)
#If there is an authorization failure, increment a counter to be used
as a
#threshold for the user (User) that failed the authorization. If the
number of
#authorization failures for a particular user exceeds the maximum
number of failures
#allowed, send an alert message.
If {MessageType} is "AuthFailure" then
    If <User>->AuthFailCount is "null" then
        Update {User}->AuthFailCount 0;
    Endif
    Update {User}->AuthFailCount Increment (<User>->AuthFailCount);
    #
    If <User>->AuthFailCount > MaxAuthFailures then
        Update {User}->AuthFailCount 0;
        SendMessage ReportDest "MultipleLogInFailures Source" {Source}
            "ExpertType" {ExpertType} "SensorType"
            {SensorType} "ExpertIP"
            {ExpertIp} "DeviceIP" {DeviceIp} "User" {User}
"TimeInMilliSecs" {TimeInMilliSecs};
    Endif
EndIf
```

This example shows a state variable approach to rule writing. While the above example uses many of the capabilities of the rule engine, more sophistication is possible. That is, state variable tables can be employed in place of simple state variables. State table representation of the current security context allow for sophisticated correlation with a minimum of complexity in the rules that use these tables. This is achievable in part because the tables provide easy-to-access facilities for storing, updating, and retrieving critical short-term information needed during the reasoning process. This process imitates some of the uses of short-term memory used by people as they reason about security events and their meaning, and since it is performed in the computer's memory rather than in a slower database, it can proceed at the very high-speeds required for real-time applications.

Selecting an optimum level of complexity in device expert rule base is a design decision that can depend on a number of factors. A most common question will be deciding which knowledge to place in the device expert and which knowledge to place in central alert correlation facilities. For example, enterprise level rules (rules that define enterprise attributes and security policy) are probably best left for analysis downstream of the device experts. Correlation of events from multiple device experts, and in particular from multiple types of device experts is preferably down downstream of the device experts. In theory one could allow device experts to communicate and reason among themselves about heterogeneous event streams, but in general it is preferred that such heterogeneous event streams are dealt with in other systems for reasons of modularity, maintainability, and comprehensibility. That said, it is not inconceivable that such an approach could be useful for special (e.g. extreme real time) applications. It should be understood that the output of the device experts can be used in any number of ways for purposes of monitoring the enterprise. The information can be displayed for action, or can be further processed as would be known in the art.

Other advantages associated with the invention include that the knowledge bases are driven by knowledge bases, not hard-coded in software. The method and system employ standard, subscription oriented knowledge bases that are easily customized. There is no practical limit on the distributed intelligence. The device experts function as sensors of the enterprise, which are always supplying an alert event stream for further analysis by a central alert correlation facility. The invention is particularly beneficial in its ability to correlate a diverse stream of events from a number of different devices.

Since the knowledge base files are easily customized, the method and system can be tailored to virtually any enterprise by the creation of specific translation files depending on the outputs of the enterprise devices. Likewise, the knowledge base table files can be created to add whatever knowledge is important to the enterprise for monitoring purposes. In addition, the rules can be written to further control the output of the knowledge containing common format events so that the alert indications are not overwhelming and provide information that is easily assimilated by the person or system assigned to monitor the enterprise.

Another advantage of the method is that is can operate in real time, so that the administrator is being fed information that is current.

Although the invention is described principally in terms of security events and alerts, it is believed that the inventive method and system has utility for any enterprise that has infrastructure elements and devices that receive and send information, wherein monitoring of the information would be valuable for running the enterprise. For example, the enterprise could be a business that operates a number of pieces of machinery and the machinery is monitored for performance. The alerts from this machinery could be processed just as the security alerts described above so that the automated manager monitoring the machinery is not overwhelmed with useless information. Another example would be a business that operates vehicles, and vehicle locations are monitored. The inventive method and system are adaptable for virtually any enterprise that has devices that supply information about the enterprise, wherein monitoring of the information is useful in the enterprise operation.

As such, an invention has been disclosed in terms of preferred embodiments thereof, which fulfills each and every one of the objects of the present invention as set forth above and provides an improved method and system tracking and filtering alerts or events in an enterprise and generating alert indications for analysis.

Of course, various changes, modifications and alterations from the teachings of the present invention may be contemplated by those skilled in the art without departing from the intended spirit and scope thereof. It is intended that the present invention only be limited by the terms of the appended claims.

What is claimed is:

1. A method of producing at least one alert indication based on a number of events derived from an enterprise comprising:
   providing a plurality of enterprise device outputs, at least a portion of the outputs having different formats, each output containing an event relating to an enterprise device;
   translating each output into a common format event comprising: matching data values in the device output with a signature specification for each enterprise device, the signature specification containing:
   a number of signatures; a first location identifier for each signature; and
   a first key;
   wherein the signature is a listing of names found in the device output, the first location identifier determines the method used to locate the name in the device output, and the first key determines where to locate the name in the device output;
   identifying a message type from a plurality message types for each enterprise device based on the device output as part of the translated common format event;
   adding knowledge to the common format event using knowledge base table files to generate a knowledge-containing common format event;
   applying one or more rules from a set of rules to the knowledge-containing common format event to generate the alert indication; and
   generating the alert indication, wherein the alert indication includes at least a text message describing the event contained in the output of the enterprise device.

2. The method of claim 1, wherein the common format event contains at least a generic description of a specific event occurring as part of each device output.

3. The method of claim 1, wherein generating the knowledge-containing common format event further comprises comparing the common format event for each network device to a number of knowledge base table entries contained in a knowledge base table, wherein knowledge is added from one or more of the knowledge base table entries when a match between the translated common format event and the entry in the knowledge base table is made.

4. The method of claim 1, wherein the enterprise devices are selected from the group consisting of a server, a firewall, a modem, a work station, a router, a remote machine, an intrusion detection system, an identification and authentication server, network monitoring and management systems, network components, and one or more combinations thereof.

5. The method of claim 1, wherein the translating step further comprises:
   producing the remainder of the translated common format event in argument name and argument value pairs using an argument specification, the argument specification containing;
   a listing of arguments;
   a field type;
   a second location identifier for each argument; and
   a second key;
   wherein each argument is a listing of argument names for inclusion in the translated common format event, the field type specifies the form of an argument value found in the device output, the second location identifier determines the location of each argument value, and the second key locates the argument value in the device output to be displayed with the argument name.

6. The method of claim 1, wherein the knowledge-containing common format event comprises one or more names selected from the group of a device alert, a generic alert, a threat severity, a benign explanation, a recommended action, a common vulnerabilities and exposure code, a conclusion, and a category code, and a corresponding value for each name.

7. The method of claim 1, wherein one or more rules determine when or whether the knowledge-containing common format event is generated, and final rule-based additions content of such generated events.

8. The method of claim 7, wherein the rule requires that the each output occur a number of times over a period of time before an alert indication is generated.

9. The method of claim 1, wherein the output is one of an unauthorized login, an unauthorized physical entry, and an attempt to bypass a firewall.

10. The method of claim 3, wherein the translating step further comprises:
    producing the remainder of the translated common format event in argument name and argument value pairs using an argument specification, the argument specification containing;
    a listing of arguments;
    a field type;
    a second location identifier for each argument; and
    a second key;
    wherein each argument is a listing of argument names for inclusion in the translated common format event, the field type specifies the form of an argument value found in the device output, the second location identifier determines the location of each argument value, and the second key locates the argument value in the device output to be displayed with the argument name.

11. The method of claim 10, wherein the rule determines when or whether the knowledge-containing common format event is generated.

12. The method of claim 11, wherein the rule requires that each output occur a number of times over a period of time before an alert indication is generated.

13. The method of claim 1, wherein a threat level is included as part of the alert indication.

14. A system for producing at least one alert indication based on a number of events derived from an enterprise comprising:
    a plurality of enterprise devices, each device capable of producing an output;
    a number of translation files, the translation files allowing the output to be translated into a common format event, the translation comprising:
    matching data values in the device output with a signature specification for each enterprise device, the signature specification containing:
    a number of signatures; a first location identifier for each signature; and
    a first key;
    wherein the signature is a listing of names found in the device output, the first location identifier determines how to locate the name in the device output, and the first key determines where to locate the name in the device output;
    identifying a message type from a plurality message types for each enterprise device based on the device output as part of the translated common format event;

a number of knowledge base table files, matching of the common format event with one or more of the knowledge base table files adding knowledge from the matched file to generate a knowledge-containing common format event;

a number of rule files, the rule files governing generation of the alert indication; and a rules processor for generating the alert indication, wherein the alert indication includes at least a text message describing the event contained in the output of the enterprise device.

15. The system of claim 14, wherein the enterprise devices are selected from the group consisting of a server, a firewall, a modem, a work station, a router, a remote machine, an intrusion detection system, an identification and authentication server, network monitoring and management systems, network components, and one or more combinations thereof, or any generator of data streams on the computer network.

16. The system of claim 14, wherein the knowledge-containing common format event comprises one or more names selected from the group of a device alert, a generic alert, a threat severity, a benign explanation, a recommended action, a CVE, a conclusion, and a category code, and a corresponding value for each name.

17. The system of claim 14, wherein the common format event comprises a message, and a number of name and value pairs derived from the output of the enterprise device.

18. The system of claim 16, wherein the rule files govern at least the frequency of the generation of the alert indication.

19. The system of claim 18, wherein the common format event comprises a message, and a number of name and value pairs derived from the output of the enterprise device.

20. The method of claim 7, wherein the rule adds information to the knowledge-containing common format event.

21. The method of claim 11, wherein the rule adds information to the knowledge-containing common format event.

* * * * *

UNITED STATES PATENT AND TRADEMARK OFFICE
CERTIFICATE OF CORRECTION

PATENT NO.        : 7,171,689 B2
APPLICATION NO. : 10/080574
DATED             : January 30, 2007
INVENTOR(S)       : John B. Beavers It is certified that error appears in the above-identified patent and that said Letters Patent is hereby corrected as shown below:

In Column 18, Line 64, Claim 14, between "plurality" and "messages" insert --of--.

Signed and Sealed this

Fifteenth Day of May, 2007

JON W. DUDAS
*Director of the United States Patent and Trademark Office*